(12) United States Patent
Dennie

(10) Patent No.: US 7,240,169 B2
(45) Date of Patent: Jul. 3, 2007

(54) PROTOCOL FOR COORDINATING THE DISTRIBUTION OF SHARED MEMORY

(75) Inventor: Shaun Dennie, Westminster, CO (US)

(73) Assignee: Sun Microsystems, Inc., Menlo Park, CA (US)

(*) Notice: Subject to any disclaimer, the term of this patent is extended or adjusted under 35 U.S.C. 154(b) by 844 days.

(21) Appl. No.: 10/050,774

(22) Filed: Jan. 18, 2002

(65) Prior Publication Data

US 2002/0059503 A1 May 16, 2002

Related U.S. Application Data

(63) Continuation of application No. 09/244,135, filed on Feb. 4, 1999, now Pat. No. 6,341,338.

(51) Int. Cl.
*G06F 12/00* (2006.01)
*G06F 13/00* (2006.01)

(52) U.S. Cl. .................. 711/153; 711/147; 711/171

(58) Field of Classification Search .......... 711/100, 711/130, 148, 153, 154, 158, 163, 170, 147
See application file for complete search history.

(56) References Cited

U.S. PATENT DOCUMENTS

| | | | |
|---|---|---|---|
| 4,675,832 A | 6/1987 | Robinson et al. | |
| 4,685,082 A | 8/1987 | Cheung et al. | |
| 5,021,947 A | 6/1991 | Campbell et al. | |
| 5,073,851 A | 12/1991 | Masterson et al. | |
| 5,075,847 A | 12/1991 | Fromme | |
| 5,107,417 A * | 4/1992 | Yokoyama | 711/206 |
| 5,119,465 A | 6/1992 | Jack et al. | |
| 5,146,593 A | 9/1992 | Brandle et al. | |
| 5,168,563 A | 12/1992 | Shenoy et al. | |
| 5,179,702 A | 1/1993 | Spix et al. | |
| 5,274,813 A | 12/1993 | Itoh | |
| 5,274,821 A | 12/1993 | Rouquie | |
| 5,297,274 A | 3/1994 | Jackson | |
| 5,301,312 A | 4/1994 | Christopher, Jr. et al. | |
| 5,325,499 A | 6/1994 | Kummer et al. | |
| 5,325,533 A | 6/1994 | McInerney et al. | |
| 5,353,401 A | 10/1994 | Iizawa et al. | |
| 5,390,314 A | 2/1995 | Swanson | |
| 5,438,659 A | 8/1995 | Notess et al. | |
| 5,450,542 A * | 9/1995 | Lehman et al. | 345/542 |
| 5,481,708 A | 1/1996 | Kukol | |
| 5,485,619 A | 1/1996 | Lai et al. | |
| 5,497,458 A | 3/1996 | Finch et al. | |
| 5,499,349 A * | 3/1996 | Nikhil et al. | 712/26 |

(Continued)

FOREIGN PATENT DOCUMENTS

DE    199 34 515 S1    1/2000

(Continued)

OTHER PUBLICATIONS

Ayers, Andrew et al., "Aggresive Inling,", ACM PLDI, pp. 134-145, 1997.

(Continued)

*Primary Examiner*—Tuan V. Thai
(74) *Attorney, Agent, or Firm*—Finnegan, Henderson, Farabow, Garrett & Dunner, L.L.P.

(57) ABSTRACT

Methods, systems, and articles of manufacture consistent with the present invention coordinate distribution of shared memory to threads of control executing in a program by using a cooperative synchronization protocol. The protocol serializes access to memory by competing threads requesting assignment of memory space, while allowing competing threads that have already been assigned memory space, to share access to the memory. A designated area of memory assigns the memory to requesting threads. The protocol is an application level entity and therefore does access the operating system to serialize the memory allocation process.

9 Claims, 5 Drawing Sheets

U.S. PATENT DOCUMENTS

| | | |
|---|---|---|
| 5,500,881 A | 3/1996 | Levin et al. |
| 5,519,866 A | 5/1996 | Lawrence et al. |
| 5,526,507 A * | 6/1996 | Hill ........................... 711/114 |
| 5,530,816 A | 6/1996 | Holt |
| 5,535,364 A * | 7/1996 | Resman et al. ............. 711/151 |
| 5,535,393 A | 7/1996 | Reeve et al. |
| 5,539,907 A | 7/1996 | Srivastava et al. |
| 5,553,235 A | 9/1996 | Chen et al. |
| 5,574,922 A | 11/1996 | James |
| 5,613,063 A | 3/1997 | Eustace et al. |
| 5,636,374 A | 6/1997 | Rodgers et al. |
| 5,640,550 A | 6/1997 | Coker |
| 5,650,948 A | 7/1997 | Gafter |
| 5,673,387 A | 9/1997 | Chen et al. |
| 5,675,790 A * | 10/1997 | Walls ......................... 707/205 |
| 5,675,802 A | 10/1997 | Allen et al. |
| 5,689,712 A | 11/1997 | Heisch |
| 5,696,937 A | 12/1997 | White et al. |
| 5,710,727 A | 1/1998 | Mitchell et al. |
| 5,734,822 A * | 3/1998 | Houha et al. ............... 717/167 |
| 5,737,605 A | 4/1998 | Cunningham et al. |
| 5,740,431 A | 4/1998 | Rail |
| 5,740,433 A | 4/1998 | Carini |
| 5,742,793 A | 4/1998 | Sturges et al. |
| 5,745,897 A | 4/1998 | Perkins et al. |
| 5,748,892 A | 5/1998 | Richardson |
| 5,748,961 A | 5/1998 | Hanna et al. |
| 5,754,820 A | 5/1998 | Yamagami |
| 5,761,426 A | 6/1998 | Ishizaki et al. |
| 5,774,724 A | 6/1998 | Heisch |
| 5,784,698 A * | 7/1998 | Brady et al. ................ 711/171 |
| 5,787,285 A | 7/1998 | Lanning |
| 5,787,480 A | 7/1998 | Scales et al. |
| 5,805,795 A | 9/1998 | Whitten |
| 5,812,799 A | 9/1998 | Zuravleff et al. |
| 5,835,705 A | 11/1998 | Larsen et al. |
| 5,850,554 A | 12/1998 | Carver |
| 5,860,024 A | 1/1999 | Kyle et al. |
| 5,864,867 A | 1/1999 | Krusche et al. |
| 5,867,649 A | 2/1999 | Larson |
| 5,867,735 A | 2/1999 | Zuravleff et al. |
| 5,872,977 A | 2/1999 | Thompson |
| 5,890,171 A | 3/1999 | Blumer et al. |
| 5,905,488 A | 5/1999 | Demers et al. |
| 5,905,856 A | 5/1999 | Ottensooser |
| 5,913,223 A | 6/1999 | Sheppard et al. |
| 5,920,895 A | 7/1999 | Perazzoli, Jr. et al. |
| 5,940,616 A | 8/1999 | Wang |
| 5,943,499 A | 8/1999 | Gillies et al. |
| 5,963,975 A | 10/1999 | Boyle et al. |
| 5,968,114 A | 10/1999 | Wentka et al. |
| 5,970,510 A | 10/1999 | Sher et al. |
| 5,974,510 A | 10/1999 | Cheng et al. |
| 5,974,536 A | 10/1999 | Richardson |
| 5,978,892 A | 11/1999 | Noel et al. |
| 5,987,479 A * | 11/1999 | Oliver ......................... 707/205 |
| 5,991,708 A | 11/1999 | Levine et al. |
| 5,991,893 A * | 11/1999 | Snider ........................... 714/4 |
| 6,006,031 A | 12/1999 | Andrews et al. |
| 6,009,514 A | 12/1999 | Henzinger et al. |
| 6,014,517 A | 1/2000 | Shagam et al. |
| 6,016,474 A | 1/2000 | Kim et al. |
| 6,018,793 A | 1/2000 | Rao |
| 6,023,583 A | 2/2000 | Honda |
| 6,044,438 A | 3/2000 | Olnowich |
| 6,049,798 A | 4/2000 | Bishop et al. |
| 6,049,855 A * | 4/2000 | Jeddeloh ..................... 711/157 |
| 6,052,708 A | 4/2000 | Flynn et al. |
| 6,052,763 A | 4/2000 | Maruyama |
| 6,055,368 A | 4/2000 | Kunioka |
| 6,065,019 A | 5/2000 | Ault et al. |
| 6,066,181 A | 5/2000 | DeMaster |
| 6,072,951 A | 6/2000 | Donovan et al. |
| 6,077,312 A | 6/2000 | Bates et al. |
| 6,081,868 A | 6/2000 | Brooks |
| 6,085,029 A | 7/2000 | Kolawa et al. |
| 6,088,771 A | 7/2000 | Steely, Jr. et al. |
| 6,098,169 A | 8/2000 | Ranganathan |
| 6,101,325 A | 8/2000 | Flaat |
| 6,101,525 A | 8/2000 | Hecker |
| 6,108,343 A * | 8/2000 | Cruickshank et al. ....... 370/437 |
| 6,119,198 A | 9/2000 | Fromm |
| 6,125,430 A | 9/2000 | Noel et al. |
| 6,141,692 A | 10/2000 | Loewenstein et al. |
| 6,145,054 A | 11/2000 | Mehrotra et al. |
| 6,167,565 A | 12/2000 | Kanamori |
| 6,173,327 B1 | 1/2001 | De Borst et al. |
| 6,173,368 B1 | 1/2001 | Krueger et al. |
| 6,205,537 B1 | 3/2001 | Albonesi |
| 6,253,252 B1 | 6/2001 | Schofield |
| 6,263,485 B1 | 7/2001 | Schofield |
| 6,263,489 B1 | 7/2001 | Olsen et al. |
| 6,269,457 B1 | 7/2001 | Lane |
| 6,282,702 B1 | 8/2001 | Ungar |
| 6,286,130 B1 | 9/2001 | Poulsen et al. |
| 6,295,600 B1 | 9/2001 | Parady |
| 6,304,951 B1 | 10/2001 | Mealey et al. |
| 6,311,320 B1 | 10/2001 | Jibbe |
| 6,314,429 B1 | 11/2001 | Simser |
| 6,317,871 B1 | 11/2001 | Andrews et al. |
| 6,341,338 B1 * | 1/2002 | Dennie ....................... 711/147 |
| 6,345,384 B1 | 2/2002 | Sato |
| 6,351,845 B1 | 2/2002 | Hinker et al. |
| 6,353,829 B1 | 3/2002 | Koblenz et al. |
| 6,353,869 B1 | 3/2002 | Ofer et al. |
| 6,366,994 B1 * | 4/2002 | Kalyur ........................ 711/173 |
| 6,367,071 B1 | 4/2002 | Cao et al. |
| 6,369,725 B1 | 4/2002 | Busaba |
| 6,430,657 B1 | 8/2002 | Mittal et al. |
| 6,434,714 B1 | 8/2002 | Lewis et al. |
| 6,434,741 B1 | 8/2002 | Mirani et al. |
| 6,438,745 B1 | 8/2002 | Kanamaru et al. |
| 6,442,162 B1 | 8/2002 | O'Neill et al. |
| 6,473,833 B1 * | 10/2002 | Arimilli et al. .............. 711/122 |
| 6,480,818 B1 | 11/2002 | Alverson et al. |
| 6,496,902 B1 | 12/2002 | Faanes et al. |
| 6,502,136 B1 | 12/2002 | Higuchi et al. |
| 6,523,090 B2 | 2/2003 | Tremblay |
| 6,542,919 B1 | 4/2003 | Wendorf et al. |
| 6,574,725 B1 | 6/2003 | Kranich et al. |
| 6,629,214 B1 | 9/2003 | Arimilli et al. |
| 6,647,546 B1 | 11/2003 | Hinker et al. |
| 6,684,296 B2 | 1/2004 | Hayter et al. |
| 6,802,057 B1 | 10/2004 | Hinker et al. |
| 2001/0003831 A1 * | 6/2001 | Boland ....................... 709/226 |
| 2001/0051974 A1 | 12/2001 | Saad |
| 2002/0046201 A1 | 4/2002 | Hembry |
| 2002/0073360 A1 | 6/2002 | Lewis et al. |
| 2002/0078010 A1 | 6/2002 | Ehrman et al. |
| 2003/0061395 A1 | 3/2003 | Kingsbury et al. |

FOREIGN PATENT DOCUMENTS

| | | |
|---|---|---|
| EP | 0 144 779 | 6/1985 |
| EP | 0 390 339 A2 | 3/1990 |
| EP | 0 817 044 A2 | 1/1998 |
| EP | 0 965 921 A2 | 12/1999 |
| EP | 1 026 592 A2 | 2/2000 |
| EP | 1 024 432 A | 8/2000 |
| EP | 1 081 585 A1 | 3/2001 |
| FR | 2 793 908 A1 | 11/2000 |
| GB | 2 324 942 A | 11/1998 |
| GB | 2 343 029 | 4/2000 |
| GB | 2 357 873 | 4/2001 |

| | | |
|---|---|---|
| JP | 03-282731 A | 12/1991 |
| JP | 07-056716 A | 3/1995 |

OTHER PUBLICATIONS

Hwu, Wen-Mei et al., "Inline Function Expansion for Compiling C Programs", ACM, pp. 246-257, 1989.

Ogasawara, Takeshi et al., "A Study of Exception Handling and Its Dynamic Optimization in Java", ACM OOPSLA, pp. 83-95, 2001.

Suganuma, Toshio et al., "A Region-Based Compilation Technique for a Java Just-in-Time Compiler", ACM PLDI, pp. 312-323, Jun. 2003.

"Visual Basic 5.0 Introduction", Windows 95 Student Manual, XX, XX, 1997, XP002926932.

Cantrill B.M. et al., "ThreadMon: A Tool for Monitoring Multithreaded Program Performance," System Sciences, 1997, Proceedings of the Thirtieth Hawaii Int'l Conference of Wailea, HI, USA Jan. 7-10, 1997, pp. 253-265.

Grundy, J.C., et al., "Supporting Flexible Consistency Management Via Discrete Change Description Propagation", Software Practice & Experience, John Willey & Sons Ltd. Chichester, GB, vol. 26, No. 9 XP000655597.

Karavanic K. L. et al., "Integrated Visualization of Parallel Program Performance Data," vol. 23, No. 1, Apr. 1, 1997 pp. 181-198.

Xu, Miller & Naim, "Dynamic Instrumentation of Threaded Applications," Internet Article, Online, <URL:ftp://ftp.cs.wisc.edu/paradyn/technical_papers/threads.pdf> Nov. 2, 1998, pp. 1-16.

"Code Complete: A Practical Handbook of Software Construction," Steve McConnell, 1993, Microsoft Press.

IBM Technical Disclosure Bulletin, "Caching Objects in a Data Space," Oct. 1, 1994, Vol. No. 37, pp. 587-590.

Microsoft Press, "Microsoft Press Computer Dictionary: Third Edition", 1997, p. 101.

Handy, Jim, "The Cache Memory Book", Second Edition, Choosing Chache Policies, Copyright 1998, pp. 55, 66, 67, 155.

Buckley, A., "Conversion to Fortran 90: A Case Study", ACM, 1994, pp. 308-353.

Purtilo, J., et al.., "Module Reuse by Interface Adaption", Software—Practice and Experience, 1991, pp. 539-556.

"dcpid—DIGITAL Continuous Profiling Infrastructure daemon", Man pages for SCR-Installed Programs (Alpha/NT), Online <URL:http://research.compaq.com/SRC/dcpi/html/ntalpha/dcpi.html>, 1997, pp. 1-6.

Browne et al., "PAPI: Portable Interface to Hardware Performance Counters," Cewes Major Shared Resources Center Pet Technical Reports, vol. 99-06; 1999, Online, <URL:http://www.wes.hpc.mil/pet/tech_reports/reports/pdf/tr_9906.pdf>, pp. 3-13.

IBM Technical Disclosure Bulletin, "Internal Performance Measurement Counters," IBM Corp., vol. 34, No. 4A, Sep. 1991, pp. 51-52 (the whole document).

IBM Technical Disclosure Bulletin, "Simultaneous Viewing of Performance Monitor Data Independent of Counters," IBM Corp., vol. 39, No. 10, Oct. 1996, pp. 181-183.

Zagha et al., "Performance Analysis Using the MIPS R10000 Performance Counters", SC96 Technical Papers, Online, <URL:http://www.supercomp.org/sc96/proceedings/SC96PROC/ZAGHA/INDEX.HTM>, Nov. 1996, pp. 1-22.

Nathan P. Kropp, Philip J. Koopman, Daniel P. Siewiorek, "Automated Robustness Testing of Off-the-Shelf Software Components," Institute for Complex Engineered Systems, Carnegie Mellon University, Pittsburgh, PA, pp. 230-239.

Valvano, "Debugging Strategies," Chapter 6, pp. 6.1-6.10, Real Time Debugging, Online Manual, Jun. 7, 1999, Retrieved from the Internet: <URL:http://ece.utexas.edu/{valvano/EE360P/PDF/Ch6.pdf>.

Broberg et al., "Visualization and Performance Prediction of Multithreaded Solaris Programs by Tracing Kernel Threads", Department of Software Engineering and Computer Science, University of Karlskrona/Ronneby, Sweden, 7 pages.

Hagganger et al., "Optimizing Dynamic Memory Management in a Multithreaded Application Executing on a Multiprocessor", International Conference on Parallel Processing, Minneapolis, MN, Aug. 10-14, 1998, pp. 262-269.

Larson et al., "Memory Allocation for Long-Running Server Applications," ISMM 1998, International Symposium on Memory Management, Vancouver, BC, Canada, Oct. 17-19, 1998, vol. 34, No. 3, pp. 176-185.

Cooper, Keith D., et al., "An Experiment with Inline Substitution," *Software Practice and Experience*, vol. 21, No. 6, Jun. 1991, pp. 581-601.

Holland, Angela, et al., "A Compiler for Selective Procedure Inlining," *Proceedings of the Annual Southease Conference*, 1993, pp. 207-212.

"Algorithm Visualization System: Introduction," available online at: www.cp/eng.chula.ac.th/faculty/spj/research/avis/intro.html as of Jun. 10, 1999, 2 pages.

"Caching Objects In A Data Space," IBM Technical Disclosure Bulletin, IBM Corp., vol. 37, No. 10, Oct. 1994, pp. 587-590.

"GeoMAMOS Project Home Page," available online at: www.ece.nwu./~theory/geomamos.html as of Jun. 10, 1999, 4 pages.

"Introduction," available online at: www.ece.nwu.edu/~theory/gs_tech_1_html/section 3_1.html as of Jun. 10, 1999, 2 pages.

"Pentium Processor Family User Manual vol. 3: Architecture and Programming Manual," pp. 25-182, 25-183, 25-309, and 25-310, Intel Corp., (1994).

"Purify for Windows NT, Product Overview," Ver. 6.0, available online at: www.rational.com/products/purify_nt/prodinfo/index.jtmpl as of Jan. 11, 1999, 4 pages.

"Scientific Simulations and Algorithm Visualizations Using NESL and Java," available online at: www.cs.cmu.edu/~scandal/applets/ as of Jun. 10, 1999, 1 page.

"Visualization for Developing Geometric Algorithms," available online at: www.ece.nwu.edu/~theory/gs_tech_1_html/section3_3.html as of Jun. 10, 1999, 2.pages.

Attali et al., "Semantic-Based Visualization for Parallel Object-Oriented Programming," Proceedings of the 11th Annual Conference on Object Oriented Programming Systems, 1996, pp. 421-440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232-282.

David E. Culler et al., "Parallel Computer Architecture", Morgan Kaufman Publishers, Inc., San Francisco, California, 1999.

Ian Foster, "Designing and Building Parallel Programs", Addison-Wesley Publishing Company, 1995.

Kevin Dowd and Charles R. Severance, "High Performance Computing," Second Edition, Chapter 10, Shared Memory Multiprocessors, Aug. 1998, pp. 216-218.

Sun Microsystems Computer Company, "Prism 5.0 Reference Manual," Revision A., Nov. 1997.

Sun Microsystems, "UltraSPARC User's Manual," UltraSPARC-1, UltraSPARC-II- Jul. 1997, pp. 319-325.

Wasserman et al., "A Grahical, Extensible Integrated Environment for Software Development," Proceedings of the ACD SIGSOFT/SIGPLAN Software Engineering Symposium on Practical Software Development Environments, 1986, pp. 131-142.

Metcalf, Michael, "convert.f90", CERN, Geneva 1991, 1997 pp. 1-27, ftp://ftp>numerical.rl.ac.uk/pub/MandR/convert.f90.

Poul-Henning Kamp, "Malloc(3) In Modern Virtual Memory Environments," XP-002283869, FreeBSD.org on-line document, Revised Fri Apr. 5, 12:50:07 1996, pp. 1-7.

Coutant, "64-Bit Application Development for PA-RISC & IA-64", Hewlett Packard, pp. 1-26, Mar. 2000.

European Search Report re: EP Application No. 00400305.9 dated Mar. 14, 2006.

Fisher, Gene, "An Overview of a Graphical Multilanguage Applications Environment".

Jacobs, "64-bit Computing", Computerworld, http://www.computerworld.com, pp. 1-3, 1998.

Microsoft, "Microsoft Interface Definition Language (MIDL): 64-Bit Porting Guide", http://msdn.microsoft.com, pp. 1-18, Aug. 1999.

* cited by examiner

PROTOCOL FOR COORDINATING THE DISTRIBUTION OF SHARED MEMORY

This is a continuation of application Ser. No. 09/244,135, filed Feb. 4, 1999, now U.S. Pat. No. 6,341,338 which is incorporated herein by reference.

FIELD OF THE INVENTION

This invention relates generally to multi-threaded applications, and more particularly to methods for coordinating the distribution of shared memory to threads of control executing in a data processing system.

BACKGROUND OF THE INVENTION

Multi-threading is the partitioning of a computer program that performs a particular process into logically independent "threads" of control that can execute in parallel. Each thread includes a sequence of instructions and data used by the instructions to carry out a particular program task, such as a computation or input/output function.

Although a single processor can execute instructions of only one thread at a time, the processor can execute multiple threads in parallel by, for example, executing instructions corresponding to one thread until reaching a selected instruction, suspending execution of that thread, and executing instructions corresponding to another thread, until all threads have completed. In this scheme, as long as the processor has begun executing instructions for more than one thread during a given time interval all executing threads are said to be "running" during that time interval, and multi-processing is achieved.

A process includes multiple threads operating out of a common address space. Processes may be configured such that portions of their address space are shared, that is, are mapped to a common physical location, or a memory. Multiple threads within a process share portions of that memory address space. It is possible for more than one thread to believe it has sole access to a portion of memory and for it to perform a series of reads and writes to an area of memory while another thread is performing reads and writes to the same area of memory. Such concurrent operation by competing threads may confuse operation of a process. Therefore, in a shared memory environment the shared memory must be allocated to each thread based on a coordination technique ensuring that only one thread has access to an area of shared memory at a time.

Current memory allocation techniques assign address space to threads in one of two ways: distribution or mutual exclusion. Distribution techniques partition shared memory into equal-sized blocks and assign the memory blocks to threads as requested. Each memory block must be large enough to meet the memory requirements of the thread requiring the most memory. Total memory requirements are dictated by the maximum demand for access to shared memory of a given thread multiplied by the total number of threads involved. This method is particularly wasteful when individual threads do not require similar amounts of shared memory. Even slight differences in the threads' memory requirements can have a significant impact on the total memory requirement.

Mutual exclusion techniques, which may be implemented in hardware or software, coordinate use of shared memory among threads by reading and writing shared variables and pointers referring to the shared addresses. Implementation of these techniques requires accessing the operating system, which is both slow and expensive.

In a mutual exclusion implementation the operating system only permits one thread at a time to access shared memory. Shared memory is assigned to a thread by exchanging signals between threads, such that a thread can be forced to stop at a specified point during execution until it has received a specific signal. More specifically, the operating system may allow a thread to access shared memory by locking the shared memory, allocating the memory for exclusive use of the thread, and unlocking the memory once the thread has completed the memory operation.

While the memory area is locked other threads are prevented from accessing it until the lock has been removed. This method is an acceptable way of allocating memory for one-time or infrequent operations, for example, the one-time startup required by a process. However, computing generally requires execution of operations that occur hundreds or even thousands of times per second, for example, when many threads are modifying a common memory area by performing a "write" operation. For such operations this method of locking and unlocking shared memory creates bottlenecks in system performance. As the number of threads making demands on system performance increases, the likelihood of a system bottleneck increases. This of course negatively impacts system performance.

SUMMARY OF THE INVENTION

Methods, systems, and articles of manufacture consistent with the present invention allocate blocks of a shared memory to threads during execution in a data processing system. Methods, systems, and articles of manufacture consistent with the present invention, as embodied and broadly described herein, involve operations that include receiving a memory allocation request, determining whether access to the shared memory is permitted for purposes of the allocation request, identifying a next available memory block in response to the memory allocation request, and designating the next available memory block in response to the request.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
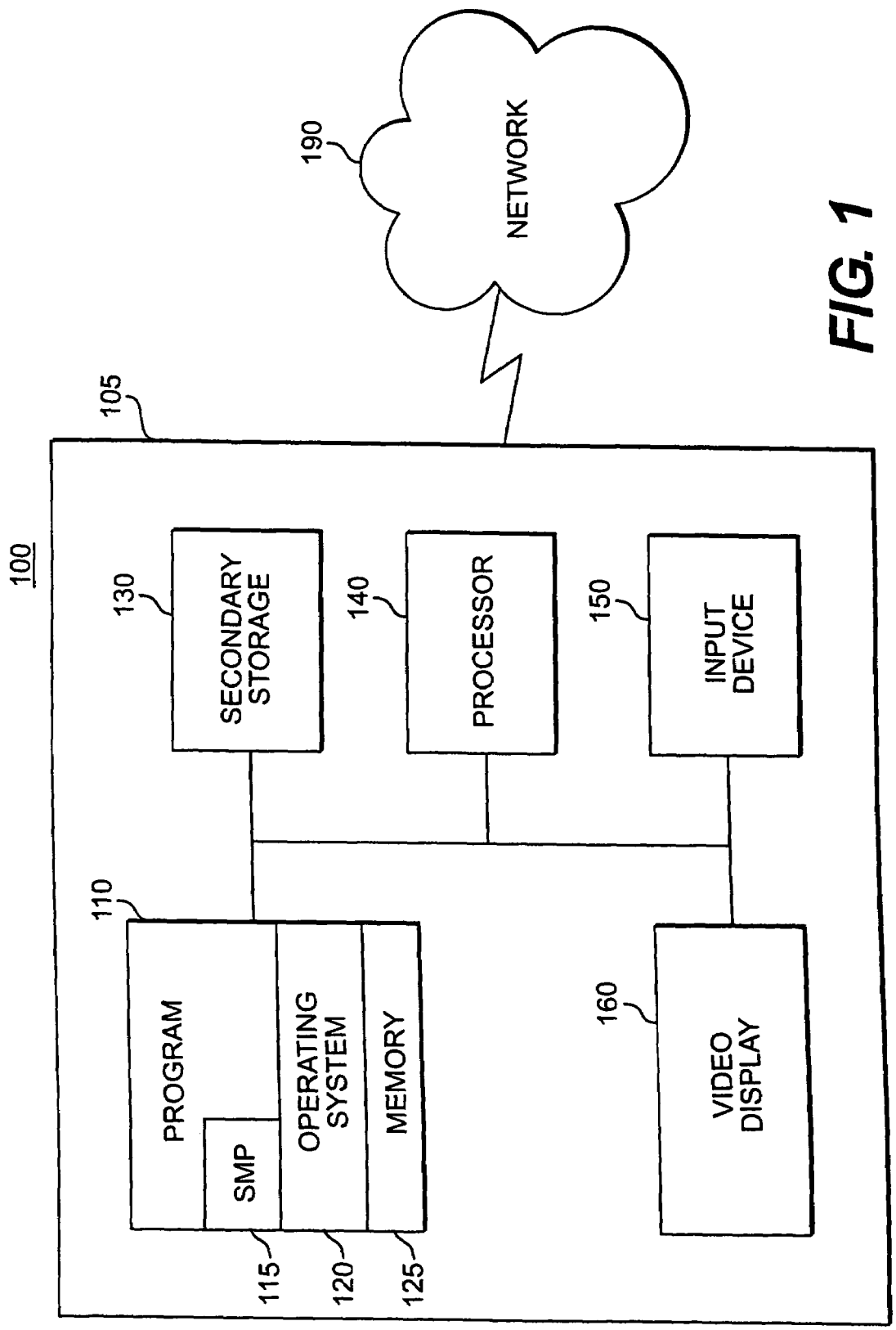
FIG. 1 depicts a block diagram of a data processing system suitable for practicing methods and systems consistent with the present the invention.

Reference will now be made in detail to an implementation consistent with the present invention as illustrated in the accompanying drawings. Wherever possible, the same reference numbers will be used throughout the drawings and the following description to refer to the same or like parts.

Overview

In accordance with methods and systems consistent with the present invention, a programmer writing a multi-threaded application program specifies in the program a total amount of memory space to be shared by the program threads during execution. The programmer also specifies a "block size," that is, the size of each partition of the total memory space to be allocated on an as-needed basis to the threads during execution. Blocks of the shared memory space are allocated to the threads serially, meaning that when a thread requires memory (for example, the computational task being performed by the thread exceeds the thread's current memory allocation), the thread determines whether its request can be processed and, if so, the thread is allocated the next available block in the shared memory space. Each thread may have a unique identifier and all thread identifiers may be provided at the beginning of program execution. Memory blocks may be assigned to the threads using the identifiers. Information may also be maintained in a designated area of the shared memory to identify each thread by its identifier as well as the specific block(s) of shared memory assigned to each thread.

A next available block indicator located in a designated area of the shared memory maintains information identifying the location (i.e., beginning address) in the shared memory for the next available block. Since all blocks are the same size, the indicator is simply updated by a fixed value based on the block size at the conclusion of each memory allocation cycle.

The programmer also specifies a shared memory protocol for the threads. This protocol, which may be included as part of the program itself or separate from the program, consists of a set of rules governing the way in which threads cooperate to access the shared memory for purposes of performing the memory allocation function. According to this protocol, when a thread requires memory, it first determines whether another thread is currently accessing the shared memory space for memory allocation purposes. This may be done by providing a "token" in a designated area of the shared memory space. The needy thread determines whether the token is available, meaning that no other thread is accessing the shared memory space to be allocated a memory block. If the token is available, the needy thread "takes" the token (i.e., indicates that the token is not currently available) and proceeds to be allocated the next available block.

If, however, the token is "taken," meaning that another thread is accessing the shared memory space to be allocated a memory block, the needy thread does not proceed. Rather, the needy thread monitors the token, waiting for it to become available, at which time the thread can be allocated a next available memory block.

Once a thread completes the allocation process, it releases the token, thus making the token available for other memory allocation cycles. At the completion of an allocation cycle the next available block indicator is updated so that the next time a thread seeks to be allocated a memory block the indicator reflects the next available block.

Although access to the shared memory space is exclusive to a single thread for purposes of the allocation process, all of the threads operating in parallel can access their designated block(s), even when the allocation process for a particular thread is ongoing. The only restriction in this scheme relates to memory block allocation, only one thread at a time can be allocated a block. Additionally, all of the threads potentially have access to all of the shared memory space. In other words, no thread has exclusive control over a particular block or set of blocks specified at the beginning of program execution.

Computer Architecture

FIG. 1 depicts an exemplary data processing system 100 suitable for practicing methods and implementing systems consistent with the present invention. Data processing system 100 includes a computer system 105 connected to a network 190, such as a Local Area Network, Wide Area Network, or the Internet.

Computer system 105 contains a main memory 125, a secondary storage device 130, a processor 140, an input device 150, and a video display 160. All of these components operate in a manner commonly understood by those skilled in the art. For example, processor 140 executes an operating system and application programs. Input device 150 receives user input and video display 160 displays output, for example, from an application program being executed by processor 140.

Main memory 125 and secondary storage device 130 may be used to store all of portions of the operating system and applications programs when they are not being executed by processor 140. For purposes of this description, however, main memory 125 is shown in FIG. 1 as including both an operating system 120 and application program 110. Operating system 120 represents any operating system, although an operating system that specifically facilitates multi-threaded program execution may be preferred, for example, the Solaris® operating system from Sun Microsystems, Inc.

Application program 110 is a multi-threaded program that performs a particular process using independent, logical threads of control that execute in parallel on processor 140. Although a single processor is shown, one skilled in the art will appreciate multiple processors may be used to implement methods and practice systems consistent with the present invention.

During execution of application program 110, its threads share access to main memory 125 and secondary storage 130. Specific implementations of memory in a data processing system may use a virtual memory to store some of the data associated with a process, allowing main memory to store data associated with more processes. In that type of system threads also share access to the virtual memory area.

Application program 110 includes a shared memory protocol 115. Shared memory protocol 115 provides a set of guidelines for threads to follow when accessing memory. Shared memory protocol 115 interacts with the threads of an application running in program 110 and with memory 125. One skilled in the art will appreciate that other implementations consistent with the present invention may implement shared memory protocol 115 separate from program 110 in either software or hardware.

Although aspects of this implementation are depicted as being stored in memory 125, one skilled in the art will appreciate that all or part of system and methods consistent with the present invention may be stored on or read form other computer-readable media, such as secondary storage devices, like hard disks, floppy disks, and CD-ROM; a digital signal received from a network such as the Internet; or other forms of ROM or RAM.

Figure 2:
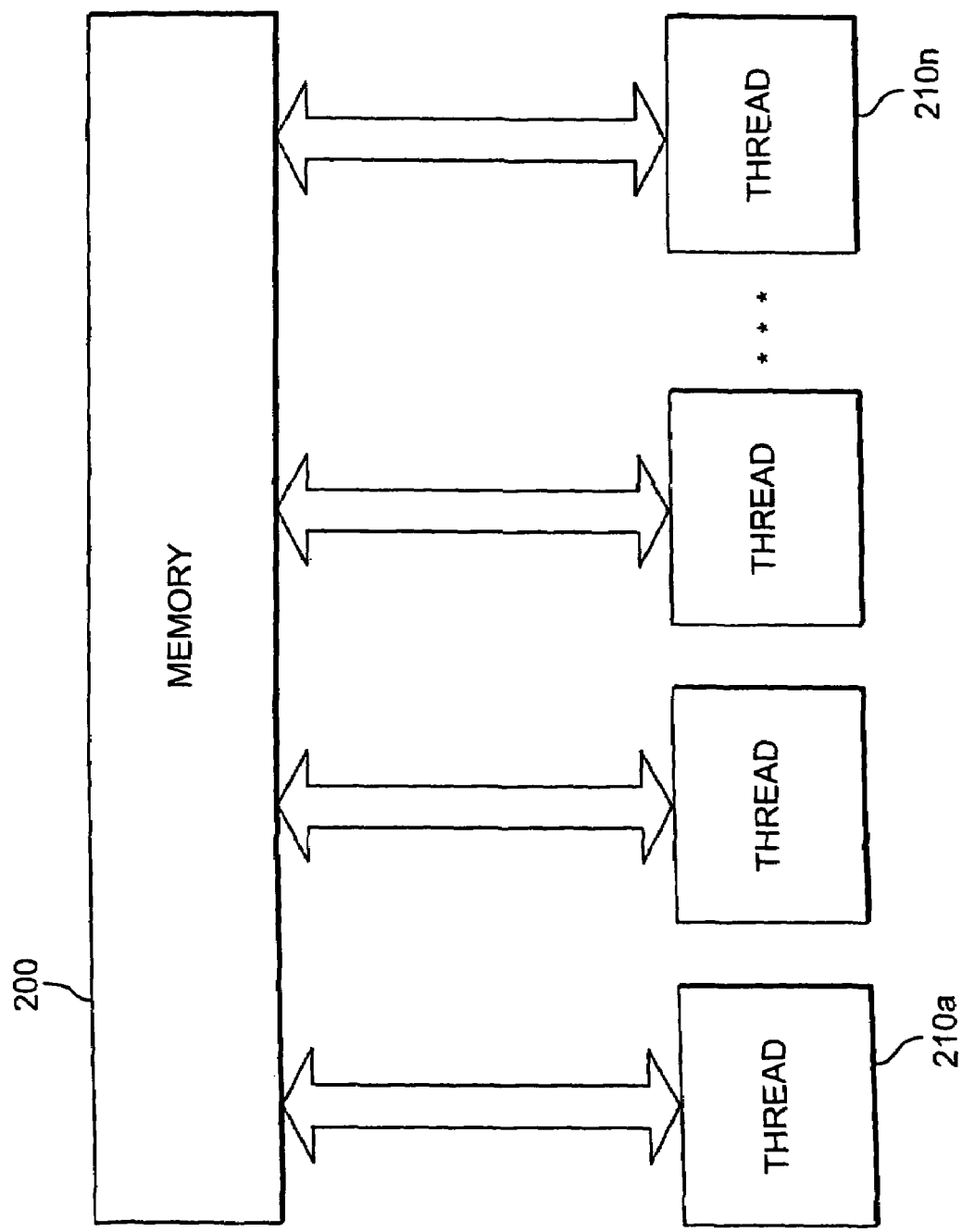
FIG. 2 depicts a logical view of multiple threads accessing a shared memory.

FIG. 2 depicts a logical representation of multiple threads sharing access to memory. When multiple threads share access to memory, each of the threads is able to access any portion of the memory. FIG. 2 shows multiple threads $210_a$–$210_n$ sharing access to memory 200. Because each of the threads $210_a$–$210_n$ may simultaneously access all of memory, it is possible for more than one thread use a portion of memory being used by another thread, confusing an operation. Therefore, threads operating in a shared memory environment compete for use of memory. Methods and systems consistent with the present invention are directed to coordinating the distribution of access to shared memory by competing threads.

Shared-Memory Allocation and Distribution System

Figure 3:
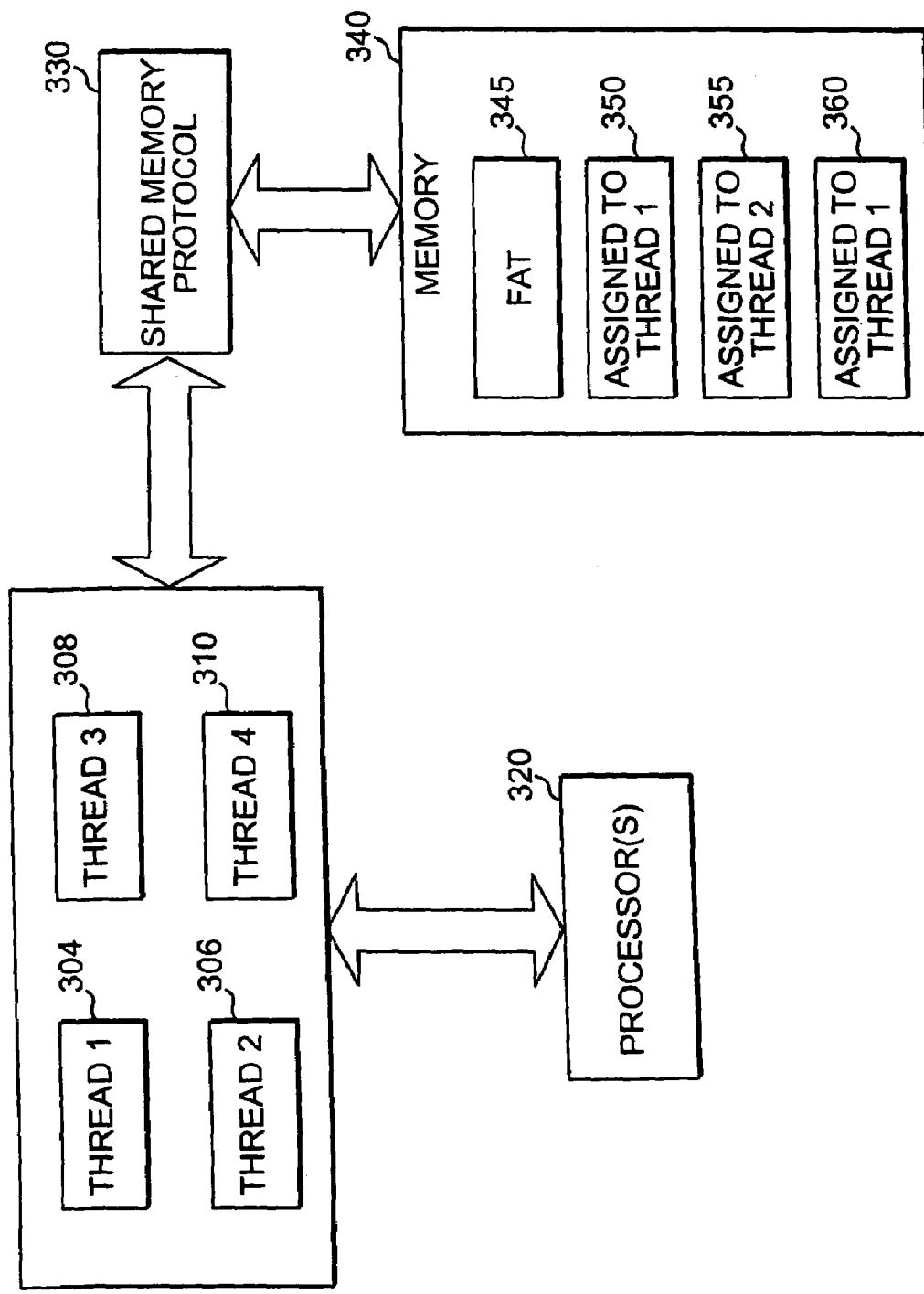
FIG. 3 depicts a block diagram used to explain the operation of a shared memory system operating in accordance with a shared memory protocol consistent with the present invention.

FIG. 3 is a logical representation of a shared memory configuration consistent with the present invention. Threads 304, 306, 308, and 310 may correspond to one or more processes that are being executed concurrently by processor 320. Again, although one processor 320 is shown in FIG. 3, methods and systems consistent with the present invention may operate in multi-processor environments as well.

Memory 340 includes a file allocation table ("FAT") 345. To facilitate parallel execution of multiple threads, memory 340 is logically partitioned into segments of equal size, as designated by a user of a shared memory system operating in accordance with the principles of the shared memory protocol 330. The partition size is used to assign a block of memory, corresponding to address space, to a thread.

When an application program begins execution and spawns its threads, each thread agrees to access memory 340 according to the rules of shared memory protocol 330. Shared memory protocol 330 describes the format of the FAT 345 to each thread. According to protocol 330, each thread agrees to view an indicator indicating whether another thread is accessing memory, to be allocated a block, before securing memory for itself. The protocol 330 allows threads that have already secured access to a block of memory to use that block for the duration of the application's execution. Each time a thread needs to secure access to a new block of memory, it must follow the rules of the shared memory protocol 330.

For example, if thread 304 has secured access to memory block 350, it may access that block of memory for the duration of a program's execution. However, while thread 306 secures access to memory block 355, thread 304 may not attempt to secure access to another block of memory 340. While thread 306 secures access to a block of memory 340, thread 304 may only access the block(s) of memory it has already secured. Once the indicator in the FAT 345 indicates that thread 306 has completed its secure operation, thread 304 may attempt to secure an additional block of memory.

The FAT 345 is used to assign a block of memory to a thread. Included in the FAT 345 are tables corresponding to current assignments of blocks of memory to threads using shared memory 340, an indicator reflecting whether a thread is currently attempting to secure access to a block of memory, and a pointer indicating a next available memory block. A thread secures access to a block of memory by receiving an assignment of a block of memory from the FAT. When a thread secures a block of memory, it increments a pointer in the FAT to the next available memory block, shown in FIG. 4.

Figure 4:
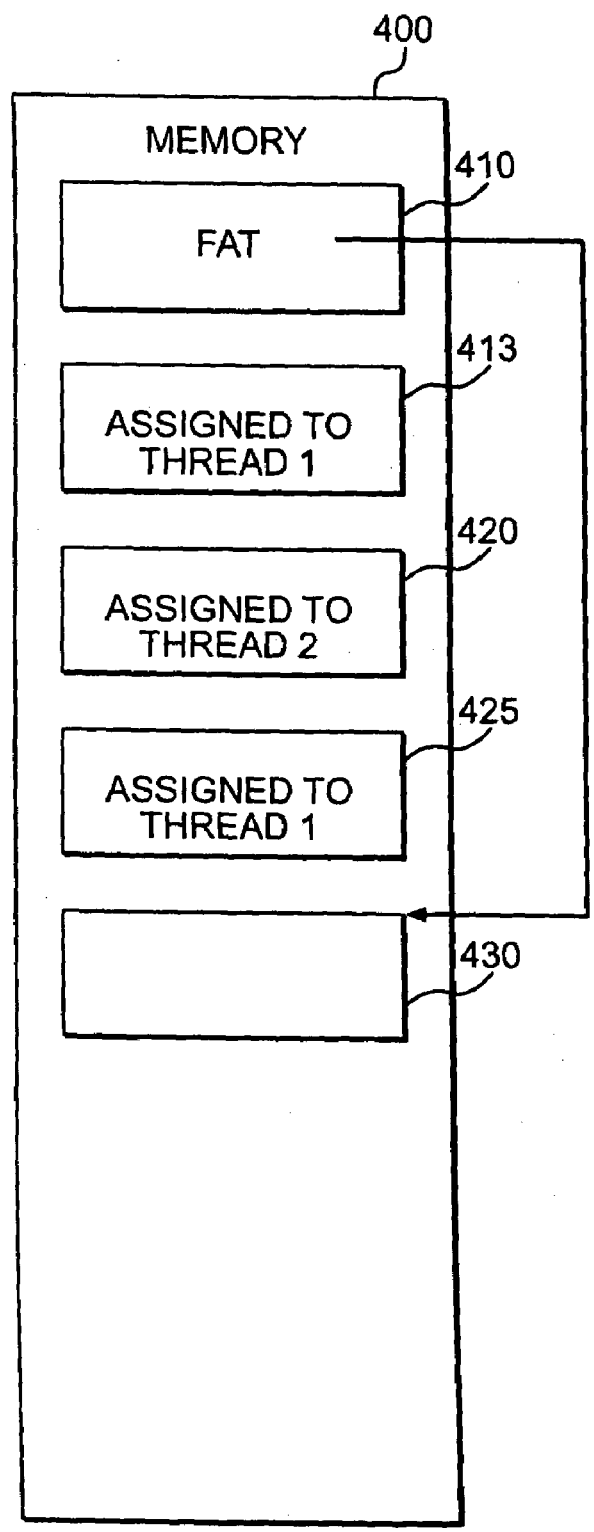
FIG. 4 depicts a physical representation of threads being allocated blocks of a shared memory in a manner consistent with the present invention.

FIG. 4 is a physical representation of how a shared memory 400 may be allocated to threads and maintained by methods and systems consistent with the present invention. Before a program executes, a user specifies both the size of a shared memory 400 and the size of individual memory blocks 415, 420, 425, and 430. Each memory block corresponds to a set of addresses. Once the size of the shared memory 400 and the size of its blocks 415, 420, 425, and 430 have been assigned, they remain constant throughout a program's execution.

Each thread that accesses memory 400 in accordance with the principles of the present invention is uniquely identifiable. Upon a first thread in a process beginning to execute, the process is assigned a process identification code. When a thread receives assignment of a memory block it is assigned a thread identification code and a memory location code. Each thread of a program may be uniquely identified by a global thread identification code, a combination of a process identification code for the process corresponding to the thread, and a thread identification code. This identification feature enables methods and systems consistent with the present invention to handle any parallel processing application, including multi-threaded applications as well as multi-processor applications running processes containing multiple threads.

Figure 5:
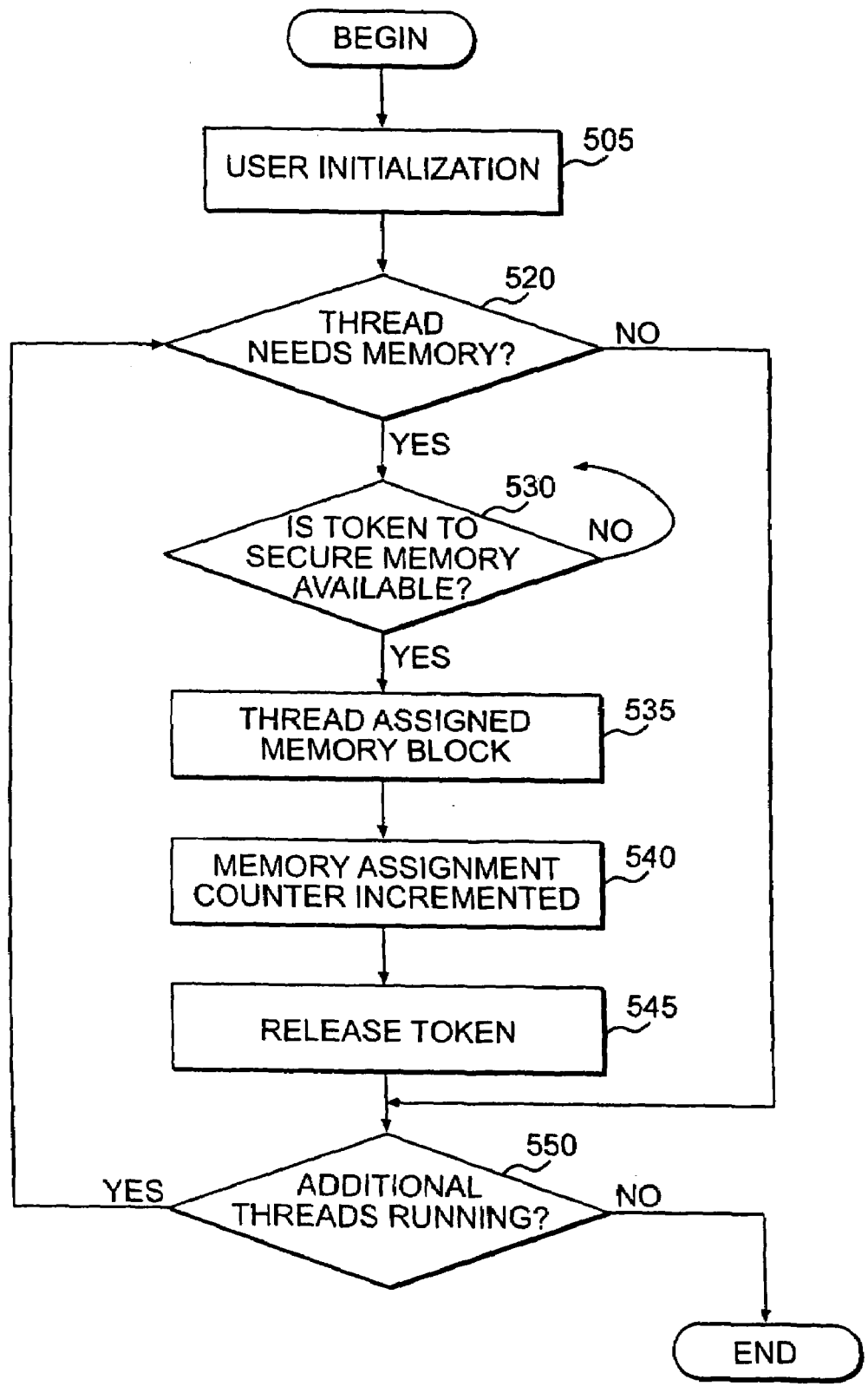
FIG. 5 depicts a flow chart illustrating operations performed by a shared memory allocation and coordination process consistent with an implementation of the present invention.

Further details on operation of a shared memory system operating in accordance with the principles of the shared memory protocol will now be explained with reference to the flow diagram of FIG. 5. Shared memory protocol begins with user initialization. During initialization, the user's program specifications are set for the size of both the shared memory and of the individual memory blocks to be assigned to threads accessing memory (step 505). The size of the shared memory area and the size of the memory blocks do not affect the operation of a shared memory allocation or distribution process consistent with the present invention. Therefore, the user may specify the sizes by using any number of criteria, for example, the memory requirements of a majority of the threads running.

Before attempting to secure access to a block of memory a thread determines whether another thread is securing access to a block of memory. If a thread determines that a "token" to secure access to memory is available (step 530), the thread secures a block of memory for itself by accessing the FAT (step 535).

Upon securing access to a block of memory, the FAT is used to assign the thread a memory location code representing the memory location of the memory block and a thread identification code, used to identify the thread within a process (step 535). Because threads are automatically assigned a next available memory block, threads of different processes may be assigned consecutive memory blocks. Each thread receives a memory block corresponding to the size of the memory blocks set by the user during initialization 505. If a thread requires more memory than that contained in an individual memory block, the thread will be assigned enough memory blocks to meet its request.

Once all of the location and identification assignments have been made, a memory assignment counter, maintained in the FAT region of the shared memory, is incremented (step 540). Incrementing the counter initiates setting a pointer to a next available memory location. Once a thread has secured access to a block of memory, the thread releases the "token" so that another thread may secure access to a block of memory (step 545).

A thread may place as many memory requests as needed. A shared memory system operating in accordance with the principles of the shared memory protocol ensures that all executing threads needing memory have an opportunity to secure access to memory by repeating the memory assignment process until all threads have completed execution (step 550).

CONCLUSION

Methods and systems consistent with the present invention coordinate distribution of shared memory among threads of control executing in a parallel computing environment. Distributing shared memory resources in a manner consistent with the principles of the present invention does not require accessing the operating system, a costly and time consuming event, to distribute shared memory among threads. Nor does a system consistent with the principles of the present invention require prohibiting competing threads from accessing a shared memory area while another thread accesses the memory.

Systems consistent with the present invention are applicable to all multi-threaded programs written in all computer programming languages, including Fortran 77, Java, C, and C++.

Although the foregoing description has been described with reference to a specific implementation, those skilled in the art will know of various changes in form and detail which may be made without departing from the spirit and scope of the present invention as defined in the appended claims and the full scope of their equivalents.

What is claimed is:

1. A system for assigning blocks of memory, the system comprising:
   an area of a memory designated for coordinating the assignment of the memory to one or more threads requiring access to the memory, wherein the area includes usage information reflecting usage of the memory; and
   a processor for performing a protocol for serializing access to the memory by the one or more threads based on the usage information, wherein the protocol allows a first thread to access a first designated block of the memory while another thread requests and secures access to another block of the memory.

2. The system of claim 1, wherein the another thread secures access to the another block of memory based on a token obtained from the area of memory that was previously used by the thread to secure access to the designated block of memory.

3. The system of claim 1, wherein the size of the designated block of memory is determined by a user.

4. The system of claim 1, wherein the another designated block of memory is adjacent to the designated block of memory.

5. A method, comprising:
   allocating to a first process, without accessing an operating system, a first block of a memory that has a size designated by a user; and
   allocating to a second process, without accessing an operating system, a second block of the memory that has a size designated by the user while the first process is accessing the first block of memory.

6. The method of claim 5, wherein the allocating of the first and second blocks of memory to the first and second processes, respectively, is based on a token obtained from a designated area of the memory.

7. The method of claim 6, wherein the first and second blocks of memory are consecutive blocks of memory.

8. The method of claim 6, wherein allocating the first block of memory comprises:
   incrementing a value that reflects a location in the memory corresponding to the first block of memory.

9. The method of claim 8, wherein allocating the second block of memory comprises:
   determining the second block of memory based on the incremented value.

* * * * *